000
(12) United States Patent
Matsuura et al.

(10) Patent No.: US 9,864,057 B2
(45) Date of Patent: Jan. 9, 2018

(54) ULTRASONIC OBJECT DETECTION DEVICE

(71) Applicants: DENSO CORPORATION, Kariya, Aichi-pref. (JP); NIPPON SOKEN, INC., Nishio, Aichi-pref. (JP); TOYOTA JIDOSHA KABUSHIKI KAISHA, Toyota-shi, Aichi-ken. (JP)

(72) Inventors: Mitsuyasu Matsuura, Nishio (JP); Taiki Yoshida, Nishio (JP); Takuya Nomura, Kariya (JP); Taketo Harada, Kariya (JP); Motonari Ohbayashi, Nagakute (JP)

(73) Assignees: DENSO CORPORATION, Kariya, Aichi-pref. (JP); NIPPON SOKEN, INC., Nishio, Aichi-pref. (JP); TOYOTA JIDOSHA KABUSHIKI KAISHA, Toyota-shi, Aichi-ken. (JP)

( * ) Notice: Subject to any disclaimer, the term of this patent is extended or adjusted under 35 U.S.C. 154(b) by 0 days.

(21) Appl. No.: 15/329,493

(22) PCT Filed: Jul. 14, 2015

(86) PCT No.: PCT/JP2015/003558
§ 371 (c)(1),
(2) Date: Jan. 26, 2017

(87) PCT Pub. No.: WO2016/017095
PCT Pub. Date: Feb. 4, 2016

(65) Prior Publication Data
US 2017/0322304 A1 Nov. 9, 2017

(30) Foreign Application Priority Data
Jul. 30, 2014 (JP) .................................. 2014-155422

(51) Int. Cl.
*G01S 15/04* (2006.01)
*G01S 15/02* (2006.01)
(Continued)

(52) U.S. Cl.
CPC .............. *G01S 15/02* (2013.01); *G01S 7/487* (2013.01); *G01S 15/04* (2013.01); *G01S 7/521* (2013.01); *G01S 7/527* (2013.01)

(58) Field of Classification Search
CPC .......... G01S 15/02; G01S 15/04; G01S 7/487; G01S 7/4876
See application file for complete search history.

(56) References Cited

U.S. PATENT DOCUMENTS

2011/0241858 A1 10/2011 Tsuzuki
2012/0212366 A1* 8/2012 Alalusi ................ G01S 7/03
342/118

FOREIGN PATENT DOCUMENTS

JP H03-108682 A 5/1991
JP H04-242189 A 8/1992
(Continued)

*Primary Examiner* — Curtis Odom
(74) *Attorney, Agent, or Firm* — Knobbe, Martens, Olson & Bear, LLP

(57) ABSTRACT

An ultrasonic object detection device includes: a first echo prolongation determination unit that sequentially determines whether a measured echo time of an ultrasonic sensor is prolonged from a reference echo time; a second echo prolongation determination unit that determines whether an addition echo time is prolonged from the reference echo time when the measured echo time is not prolonged from the reference echo time, and the ultrasonic sensor detects a reflected wave, the addition echo time being obtained by adding, to the measured echo time, a time from termination of an echo to termination of a first reflected wave; and a short distance object detection unit that determines that an object is disposed within a short distance so as to receive the
(Continued)

reflected wave while the echo is not terminated when one of the measured echo time or addition echo time is prolonged from the reference echo time.

8 Claims, 5 Drawing Sheets

(51) Int. Cl.
*G01S 7/487* (2006.01)
*G01S 7/521* (2006.01)
*G01S 7/527* (2006.01)

(56) References Cited

FOREIGN PATENT DOCUMENTS

| | | |
|---|---|---|
| JP | H05-045456 A | 2/1993 |
| JP | H09-145836 A | 6/1997 |
| JP | 2001-133549 A | 5/2001 |
| JP | 2002-090452 A | 3/2002 |

* cited by examiner

ULTRASONIC OBJECT DETECTION DEVICE

CROSS REFERENCE TO RELATED APPLICATION

This application is based on Japanese Patent Application No. 2014-155422 filed on Jul. 30, 2014, the disclosure of which is incorporated herein by reference.

TECHNICAL FIELD

The present disclosure relates to an ultrasonic object detection device that detects an object by transmitting or receiving an ultrasonic wave.

BACKGROUND ART

In an ultrasonic object detection device, an ultrasonic sensor transmits an ultrasonic wave, and receives a reflected wave stemming from reflection of the ultrasonic wave from an object. The ultrasonic wave to be transmitted shall be referred to as a transmission wave. A receiving wave obtained immediately after the transmission wave is transmitted exhibits higher signal strength because of an echo of the transmission wave.

Patent literature 1 discloses that when a reflected wave is present because an object or the like exists at a near distance, the wave reflected is added to an echo wave caused by transmission and the duration of the echo wave gets prolonged.

In the patent literature 1, designation of a reference time precedes determination on presence or absence of an object. As the reference time, a termination time of a receiving wave signal to be received concurrently with transmission of an ultrasonic wave is designated. The designated reference time is equivalent to an echo time elapsing when an object is absent.

As for determination on presence or absence of an object, when the termination time of a receiving wave signal to be received concurrently with transmission of an ultrasonic wave gets longer than the reference time, a near-distance object is determined to be present.

In the patent literature 1, when the echo time measured when whether an object is present or absent is determined gets longer than the reference time designated prior to determination on presence or absence of an object, a near-distance object is determined to be present. However, even when an object exists at a near distance, the echo time may not get longer. Therefore, the technology in the patent literature 1 cannot precisely detect an object existing at a near distance.

PRIOR ART LITERATURES

Patent Literature

Patent Literature 1: Japanese Patent No. 3296804

SUMMARY OF INVENTION

It is an object of the present disclosure to provide an ultrasonic object detection device capable of highly precisely detecting an object existing at a near distance.

According to a first aspect of the present disclosure, an ultrasonic object detection device includes: a first echo prolongation determination unit that sequentially determines whether a measured echo time, which is a duration of an echo sound to be detected by an ultrasonic sensor after the ultrasonic sensor transmits a transmission wave, is prolonged with respect to a reference echo time; a second echo prolongation determination unit that determines whether an addition echo time is prolonged with respect to the reference echo time when the first echo prolongation determination unit determines that the measured echo time is not prolonged with respect to the reference echo time, and the ultrasonic sensor detects a reflected wave generated by reflection of the transmission wave on an object, the addition echo time being obtained by adding, to the measured echo time, a time which elapses after an echo is terminated in a receiving signal of the ultrasonic sensor before a first reflected wave as the reflected wave generated for a first time is terminated; and a short distance object detection unit that determines that an object is disposed within a short distance so as to receive the reflected wave while the echo is not terminated when one of the measured echo time or addition echo time is prolonged with respect to the reference echo time.

When an object exists near the ultrasonic sensor, an echo wave and reflected wave may be superposed on each other and observed as one wave. The wave having the echo wave and reflected wave superposed on each other may exhibit a notch, and may be observed as two waves in terms of processing. Depending on the position of the notch, although an object exists at such a short distance as to receive a reflected wave despite presence of an echo, the measured echo time may be determined not to have gotten prolonged relative to the reference echo time.

In the ultrasonic object detection device, even when the measured echo time is determined not to have gotten prolonged relative to the reference echo time, if the ultrasonic sensor has detected a reflected wave, whether the addition echo time that is a time obtained by adding a time, which elapses until a first reflected wave terminates after an echo terminates, to the measured echo time has gotten prolonged relative to the reference echo time is determined. This is because if an object exists at such a short distance as to receive a reflected wave despite presence of an echo, there is a possibility that a wave having the echo wave and reflected wave superposed on each other may be observed as two waves because of a notch.

Even when the addition echo time is determined to have gotten prolonged relative to the reference echo time, an object is determined to exist at such a short distance as to receive a reflected wave despite presence of an echo. Therefore, the object existing at a short distance can be highly precisely detected.

According to a second aspect of the present disclosure, an ultrasonic object detection device includes: an echo prolongation determination unit that sequentially determines whether a measured echo time, which is a duration of an echo sound to be detected by an ultrasonic sensor after the ultrasonic sensor transmits a transmission wave, is prolonged with respect to a reference echo time; and a short distance object detection unit that determines that an object is disposed within a short distance so as to receive a reflected wave while an echo is not terminated when the measured echo time is prolonged with respect to the reference echo time. The short distance object detection unit repeatedly determines, based on a determination result of the echo prolongation determination unit, whether the object is disposed within the short distance. When determining that the object is disposed within the short distance, the short distance object detection unit sets a short distance detection state. Successively, even when the measured echo time is not prolonged with respect to the reference echo time, the short distance object detection unit holds to set the short distance detection state for a predetermined number of repetitive times.

If an object exists near the ultrasonic sensor, an echo wave and reflected wave may be superposed on each other. However, depending on a degree of superposition of the echo wave and reflected wave on each other, for example, in a case where the reflected wave is fully superposed on the echo wave, the measured echo time may not get prolonged relative to the reference echo time. However, since an object will not suddenly vanish, if the object is determined to exist at a short distance, there is a high possibility that the object may exist at a short distance for a while. Therefore, in the ultrasonic object detection device, when an object is determined to exist at a short distance, a short distance detection state is established. Thereafter, even if the measured echo time is determined not to have gotten prolonged relative to the reference echo time, the short distance detection state is retained a predetermined number of times. Thus, an object existing at a short distance can be highly precisely detected.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
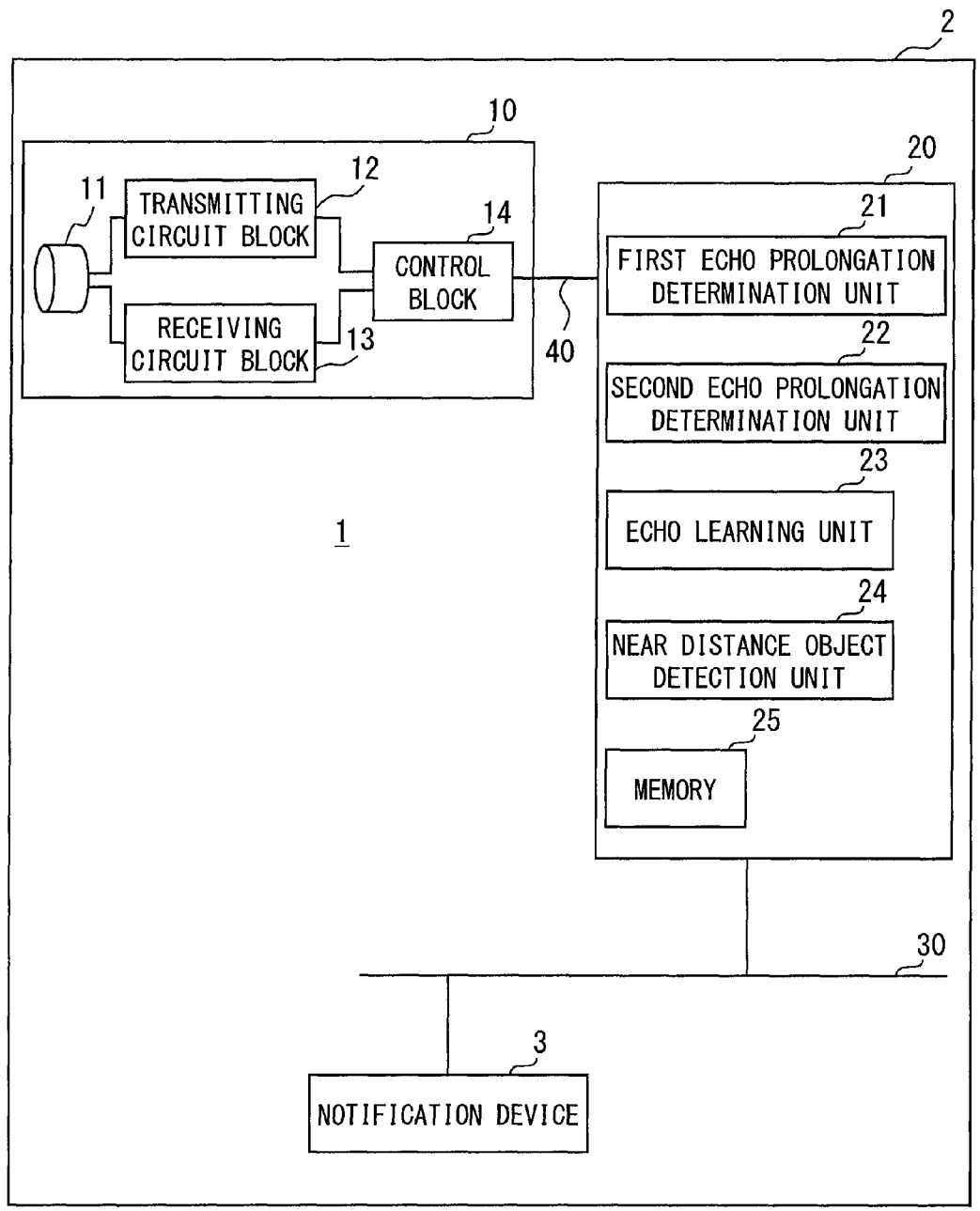
FIG. 1 is a configuration diagram of an object detection system 1.

Referring to the drawings, an embodiment of the present disclosure will be described below. An object detection system 1 shown in FIG. 1 is mounted in a vehicle 2, and includes a notification device 3, an ultrasonic sensor 10, and an ECU 20 that is an embodiment of an ultrasonic object detection device of the present disclosure. The notification device 3 is a display device or loudspeaker. The notification device 3 outputs a message or sound with which a driver is notified of the fact that an object has been detected.

As for the ultrasonic sensor 10, although only one ultrasonic sensor is shown in FIG. 1 for convenience' sake, a plurality of ultrasonic sensors 10 may be included. As shown in FIG. 1, the ultrasonic sensor 10 includes a transmitting and receiving element 11, transmitting circuit block 12, receiving circuit block 13, and control block 14.

The transmitting and receiving element 11 transmits an ultrasonic wave, and receives a reflected wave produced when the transmitted ultrasonic wave (hereinafter, transmission wave) is reflected from an external object. The transmitting and receiving element 11 is one element to be engaged in both transmitting and receiving.

The transmitting circuit block 12 produces a pulsating signal by pulse-modulating a sine wave of a predetermined frequency falling within an ultrasonic region. Based on the pulsating signal, an ultrasonic wave is cyclically outputted from the transmitting and receiving element 11. The cycle at intervals of which an ultrasonic wave is outputted is, for example, several hundreds of milliseconds. The receiving circuit block 13 amplifies and analog-to-digital converts a signal (hereinafter, a receiving signal), which is induced in the transmitting and receiving element 11 after transmission of a transmission wave, and then outputs the resultant signal to the control block 14.

The control block 14 outputs an instruction signal, which instructs production of a pulsating signal, to the transmitting circuit block 12. Further, the control block 14 acquires a receiving signal from the receiving circuit block 13. Based on the acquired receiving signal, the control block 14 performs measurement of an echo time and detection of a reflected wave. The echo time is a time that elapses until the signal strength of a receiving signal (hereinafter, receiving signal strength) falls below a strength thresholds $TH_A$ for the first time after a transmission signal is transmitted. The time signifies a duration of an echo sound. The echo time measured by the control block 14 shall be referred to as a measured echo time.

Detection of a reflected wave is initiated at a time point when the measured echo time has elapsed after a transmission signal is transmitted. The detection of a reflected wave is to determine the time point when the receiving signal strength exceeds the strength threshold $TH_A$. In the present embodiment, the strength threshold $TH_A$ employed in determination of the measured echo time has the same value as the strength threshold $TH_A$ employed in the detection of a reflected wave does. Alternatively, the strength thresholds may take on mutually different values.

The ECU 20 determines an echo learning value and outputs it to the control block 14. A predetermined initial value is employed until the echo learning value is learned. After initiating detection of a reflected wave, the control block 14 multiplies a time, which elapses until the receiving signal strength exceeds the strength threshold $TH_A$ after detection of a reflected wave is initiated, by the sonic speed, and thus calculates a distance to an object. Hereinafter, the distance calculated by the control block 14 of the ultrasonic sensor 10 shall be referred to as a detection distance D. The ultrasonic sensor 10 is connected to the ECU 20 over a LIN bus 40. The control block 14 outputs the measured echo time, detection distance D, a time when the signal strength of a reflected wave exceeds the strength threshold $TH_A$, a time when the signal strength of the reflected wave falls below the strength threshold $TH_A$, and a crest value to the ECU 20. The crest value is a maximum value observed until the signal strength of a reflected wave falls below the strength threshold $TH_A$ after the signal strength exceeds the strength threshold $TH_A$.

The ECU 20 has a known circuitry including a CPU, ROM, RAM, input/output interface, and memory 25. When the CPU runs a program stored in the ROM or memory 25, the ECU 20 functions as a first echo prolongation determination unit 21, second echo prolongation determination unit 22, echo learning unit 23, or near distance object detection unit 24. The first echo prolongation determination unit 21 is equivalent to each of a first echo prolongation determination unit and echo prolongation determination unit. Pieces of processing of the respective units 21 to 24 will be described in conjunction with FIG. 2 and others. Part or all of the features to be implemented by the ECU 20 may be formed by hardware using one or a plurality of ICs.

The ECU 20 is connected onto an internal LAN 30. The notification device 3 is also connected onto the internal LAN 30. When detecting that an object exists within a notification range, the ECU 20 uses the notification device 3 to notify that the object exists within the notification range.

Figure 2:
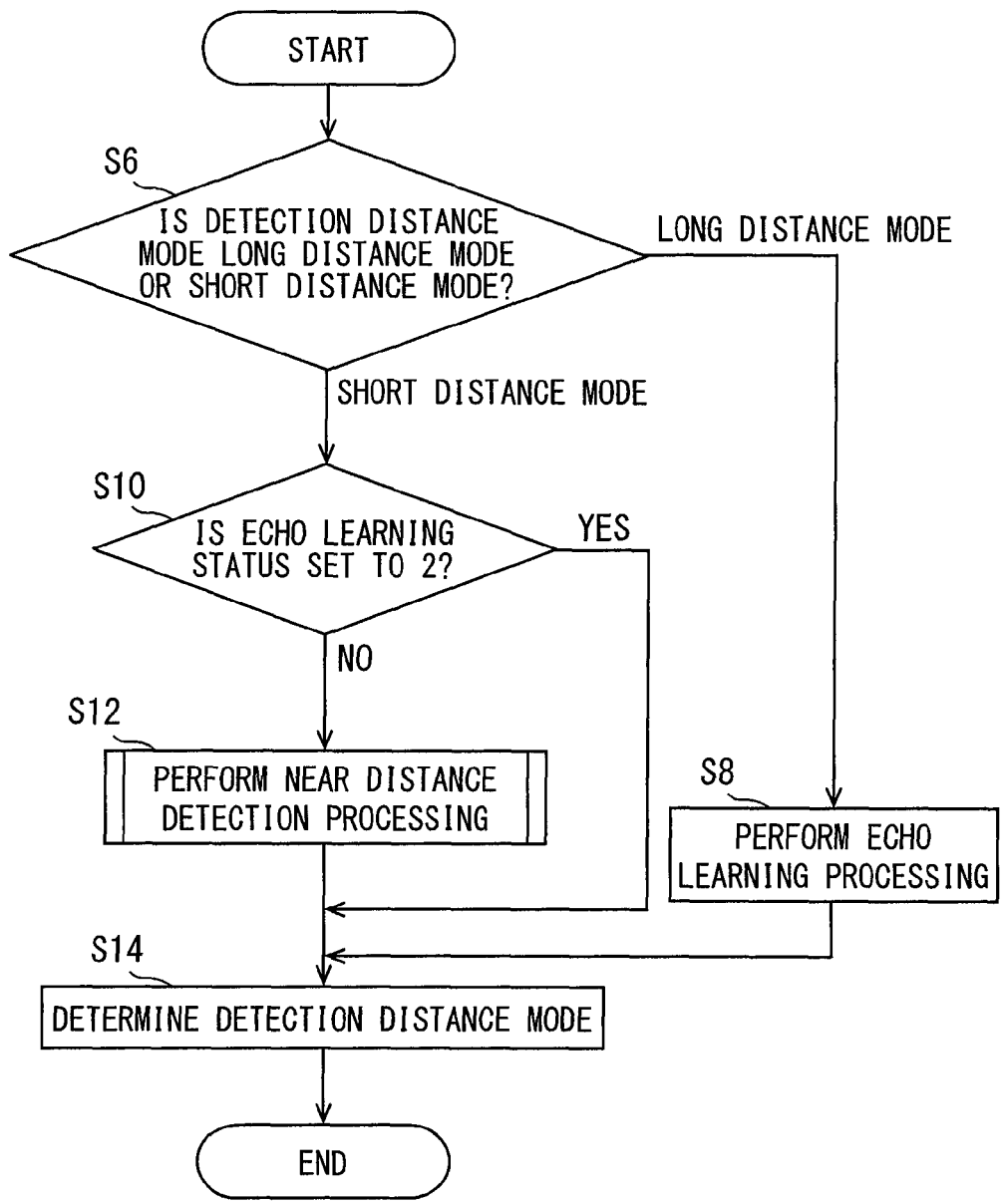
FIG. 2 is a main routine of processing to be performed by an ECU in FIG. 1.

The ECU 20 performs a main routine mentioned in FIG. 2. While an ignition switch is held on, the main routine mentioned in FIG. 2 is cyclically performed at intervals of an ultrasonic wave output cycle. In FIG. 2, step S10 is performed by the second echo prolongation determination unit 22, steps S6 and S14 are performed by the first echo prolongation determination unit 21, and step S8 is performed by the echo learning unit 23.

At step S6, whether a detection distance mode is a long distance mode or near distance mode is determined. The detection distance mode is determined at step S14 to be described later. The near distance mode is a mode to be implemented when a determination is made that there is a possibility that an object may exist at such a near distance as to receive a first reflected wave R1 despite presence of an echo. An initial mode of the detection distance mode is the long distance mode. If the detection distance mode is the long distance mode, the main routine proceeds to step S8.

At step S8, echo learning processing is performed. The echo learning processing is processing of updating an echo learning value. The echo learning value is designated based on a measured echo time that is measured by the control block 14 of the ultrasonic sensor 10. Since the measured echo time varies depending on the state of the ultrasonic sensor 10, the echo learning value is updated. The echo learning value is equivalent to a reference echo time.

In the present embodiment, the echo learning value is determined as described below. To begin with, a measured echo time that meets both conditions 1 and 2 is stored in the memory 25. The condition 1 is that a measured echo time is normal, and the condition 2 is that the detection distance mode is the long distance mode and no object is detected. A normal range of measured echo times is predesignated. As long as the measured echo time falls within the normal range, the measured echo time is normal. The condition 1 is a condition under which the system including the ultrasonic sensor 10 is determined to be normal. The measured echo time that meets the conditions 1 and 2 is stored in the memory 25.

If the number of measured echo times equal to or larger than a predetermined number of times is stored in the memory 25, the same number of measured echo times as the predetermined number of times is retrieved from the memory 25 in the order that the newest one is retrieved first. A maximum value among the same number of measured echo times as the predetermined number of times is used to update the echo learning value. The same number of measured echo times as the predetermined number of times shall be regarded as measured echo times stored during a period from when the ignition switch is turned on to when the ignition switch is turned off.

As a result of comparing the updated echo learning value with an echo learning value that has not been updated, if no change is made, an echo learning status is set to 0. If a change is made, the echo learning status is set to 1. After the ignition switch is turned on or after the echo learning value is discarded, before an initial echo learning value is determined, the echo learning status is set to 2. Specifically, the echo learning status 0 signifies that the echo learning value has not undergone any change, the echo learning status 1 signifies that the echo learning value has undergone a change, and the echo learning status 2 signifies that learning is incomplete. The echo learning processing of step S8 has been described so far.

If the detection distance mode is determined at step S6 to be the near distance mode, step S10 is performed. At step S10, whether the echo learning status is set to 2 is determined. If the echo learning status is set to 2 (S10: YES), the main routine proceeds to step S14. If the echo learning status is not 2, that is, is 0 or 1 (S10: NO), the main routine proceeds to step S12.

Figure 3:
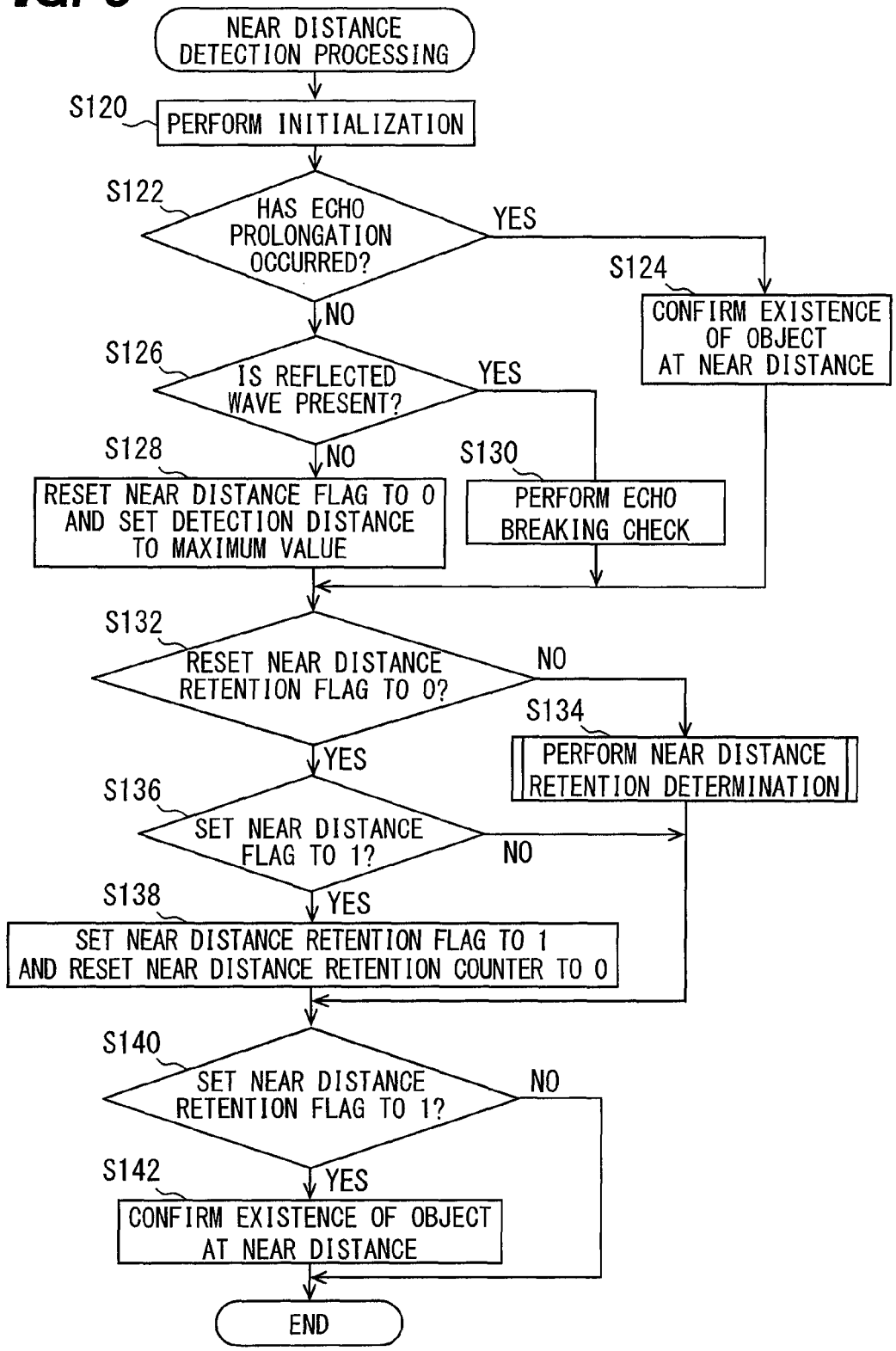
FIG. 3 is a flowchart describing near distance detection processing of step S12 in FIG. 2.

At step S12, near distance detection processing is performed. The near distance detection processing is processing described in FIG. 3. In FIG. 3, steps S120 and S122 are performed by the first echo prolongation determination unit 21, steps S126 and S130 are performed by the second echo prolongation determination unit 22, and the other steps are performed by the near distance object detection unit 24.

At step S120, initialization is performed in order to reset a near distance flag and detection distance D to 0s respectively. At step S122, whether the measured echo time has gotten prolonged relative to the echo learning value is determined. Specifically, for the determination, a current measured echo time is compared with an echo learning value+a predetermined time Δt. As a result of the comparison, if the measured echo time is larger, the measured echo time is recognized as having gotten prolonged relative to the echo learning value (S122: YES).

The reason why the echo learning value itself is not compared with the measured echo time but Δt is added to the echo learning value is that a consideration is taken into the fact that the measured echo time gets longer depending on the state of the ultrasonic sensor 10. The addition of Δt to the echo learning value is not a must, but the echo learning value itself may be compared with the measured echo time.

If echo prolongation is determined to have occurred (S122: YES), the processing proceeds to step S124. At step S124, existence of an object at a near distance is confirmed. More particularly, a near distance flag is set to 1. The near distance flag is a flag to be set to 1 when an object is determined to have been detected at a near distance. At step S124, the detection distance D is determined. The detection distance D is set to a value obtained by multiplying the echo learning value by the sonic speed. Since a first reflected wave R1 is buried in an echo wave R0, it is impossible to calculate the detection distance D by detecting the first reflected wave R1. Therefore, the echo learning value is substituted for the detection time of the first reflected wave R1.

If echo prolongation is determined at step S122 not to have occurred (S122: NO), the near distance detection processing proceeds to step S126. At step S126, the control block 14 of the ultrasonic sensor 10 determines based on a signal, which is outputted from the ECU 20, whether a reflected wave is present.

If a reflected wave is determined to be absent (S126: NO), the near distance detection processing proceeds to step S128. At step S128, the near distance flag is reset to 0, and the detection distance D is set to a maximum value. Setting the detection distance D to the maximum value signifies that no object is detected.

If a reflected wave is determined to be present (S126: YES), the near distance detection processing proceeds to step S130. At step S130, echo breaking check is performed. The echo breaking check is performed as described below. To begin with, the echo wave R0 and first reflected wave R1 are joined. A resultant wave (hereinafter a joint wave) is regarded as the echo wave R0 in order to determine an addition echo time. The addition echo time is a time obtained by adding a time, which elapses until the first reflected wave R1 terminates after the measured echo time terminates, to the measured echo time.

The addition echo time is substituted for the measured echo time, and is, similarly to step S122, compared with the echo learning value+$\Delta$t. When a result of the comparison demonstrates that the addition echo time is larger, if the crest value of the first reflection wave R1, that is, the maximum signal strength of the first reflection wave R1 is saturated, echo prolongation is regarded as having occurred. If echo prolongation is determined to have occurred, the near distance flag is set to 1. When the near distance flag is set to 1, the detection distance D is set to a value obtained by multiplying the echo learning value by the sonic speed. If the addition echo time is equal to or smaller than the echo learning value+$\Delta$t, echo prolongation is determined not to have occurred. The near distance flag is reset to 0.

Figure 4:
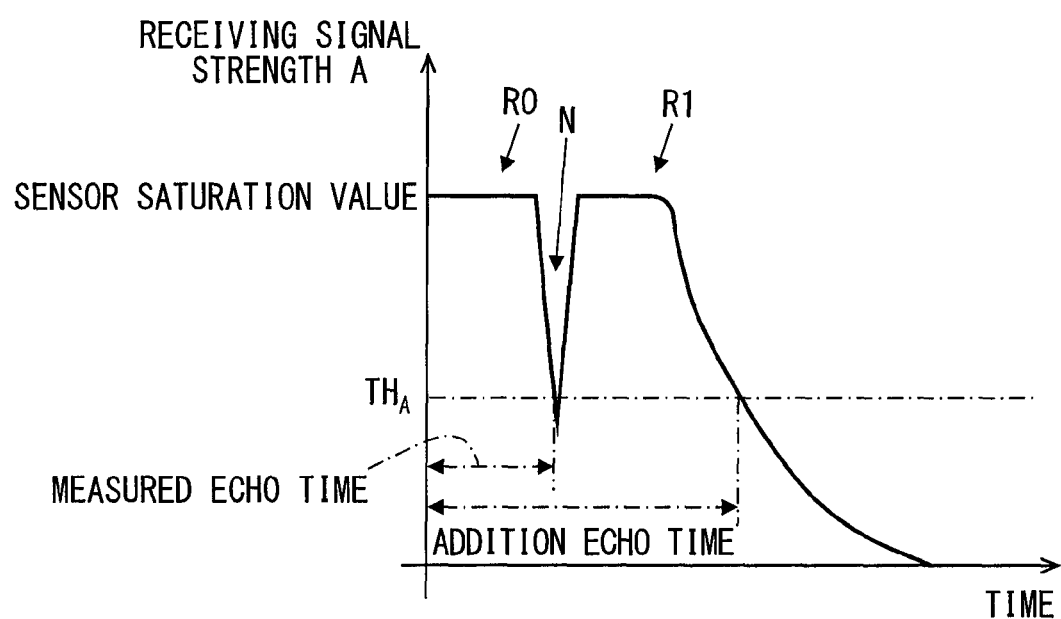
FIG. 4 is a diagram showing an example of a state in which an echo wave R0 and first reflected wave R1 are superposed on each other.

The reason why the addition echo time is calculated and then, similarly to the measured echo time, compared with the echo learning value+$\Delta$t is that a wave having the echo wave R0 and first reflected wave R1 superposed on each other exhibits, as shown in FIG. 4, a notch N at which the receiving signal strength once falls below the strength threshold $TH_4$. Because of the notch N, echo prolongation may be determined at step S122 not to have occurred. However, even the wave shown in FIG. 4 has the echo wave R0 and first reflected wave R1 superposed on each other. Therefore, the addition echo time is compared with the echo learning time+$\Delta$t.

After step S130 is performed, the near distance detection processing proceeds to step S132. Even when steps S124 and S128 are preformed, the processing proceeds to step S132. At step S132, whether a near distance retention flag is reset to 0 is determined. The near distance retention flag is a flag for use in retaining a result of determination, which signifies that an object exists at a near distance for a while, after the near distance flag is set to 1. Setting the near distance retention flag to 1 signifies that near distance detection is in progress. Resetting the near distance retention flag to 0 signifies that near distance detection is not in progress. Setting the near distance retention flag to 1 is equivalent to a near distance detection state. The near distance retention flag is set to 1 when step S138 to be described later is performed. At step S134, if a predetermined condition is met, the near distance retention flag is reset to 0.

When the near distance retention flag is not reset to 0, that is, the near distance retention flag is set to 1, a determination to be made at step S132 is NO, and the near distance detection processing proceeds to step S134. At step S134, near distance retention determination is performed. The near distance retention determination is processing of determining whether the near distance retention flag is held 1.

Figure 5:
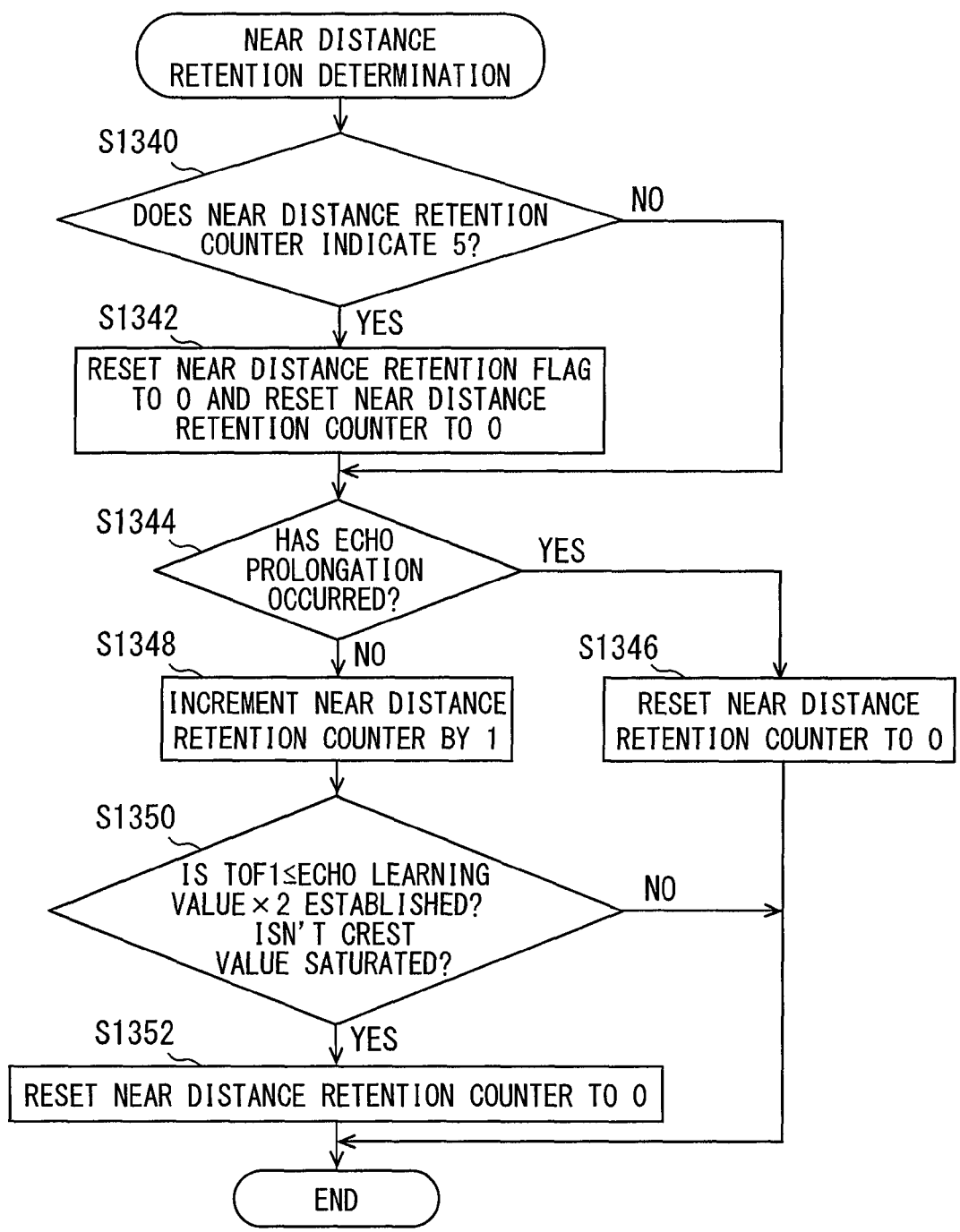
FIG. 5 is a flowchart describing near distance retention determination processing of step S134 in FIG. 3.

Near distance retention determination is processing described in FIG. 5. In FIG. 5, step S1344 is performed by the first echo prolongation determination unit 21, and the other steps are performed by the near distance object detection unit 24. At step S1340, whether a near distance retention counter indicates 5 is determined. The near distance retention counter takes on a value ranging from 0 to 5. Namely, the maximum value of the near distance retention counter is 5.

When the near distance retention counter does not indicate 5 (S1340: NO), the near distance retention determination processing proceeds to step S1344. When the near distance retention counter indicates 5 (S1340: YES), the processing proceeds to step S1342.

At step S1342, the near distance retention flag is reset to 0 and the near distance retention counter is reset to 0. Since the near distance retention flag is reset to 0, a state in which near distance detection is in progress is not retained. Since the state in which near distance detection is in progress is not retained, the near distance retention counter is reset to 0. In other words, the near distance retention counter is reset. After step S1342 is performed, the near distance retention determination processing proceeds to step S1344.

At step S1344, whether the measured echo time has gotten prolonged relative to the echo learning value is determined. The determining technique is identical to step S122 in FIG. 3. If the measured echo time is determined to have gotten prolonged, the near distance retention determination processing proceeds to step S1346. At step S1346, the near distance retention counter is reset to 0. Therefore, the state in which near distance detection is in progress will be retained five times thereafter. If the measured echo time is determined to have gotten prolonged relative to the echo learning value, it means that existence of an object at a near distance is confirmed at step S124. The near distance retention counter is therefore reset to 0, and the state in which near distance detection is in progress will be retained five times thereafter.

If the measured echo is determined at step S1344 not to have gotten prolonged (S1344: NO), the near distance retention determination processing proceeds to step S1348. At step S1348, the near distance retention counter is incremented by one. Thereafter, the processing proceeds to step S1350.

At step S1350, whether a time that elapses until the signal strength of the first reflected wave R1 exceeds the strength threshold $TH_4$, that is, the detection time TOF1 of the first reflected wave R1 is equal to or smaller than a double of the echo learning value and the crest value of the first reflected wave R1 is not saturated is determined.

The determination is intended to determine whether multiple reflection has occurred because an object exists at a near distance, the original first reflected wave R1 is buried in the echo wave R0, and the apparent first reflected wave R1 that can be observed is, in reality, a second reflected wave stemming from two reflections.

If the first reflected wave R1 cannot be observed but is buried in the echo wave R0, the observation time of the original first reflected wave R1 is equal to or smaller than the measured echo time. In principle, a time during which two reflections are observed is a double of the observation time of the first reflected wave R1. Therefore, if the original first reflected wave R1 is buried in the echo wave R0 and the apparent first reflection wave R1 that can be observed is, in reality, a reflected wave stemming from two reflections, TOF1≤the echo learning value×2 is established.

Since a reflected wave stemming from two reflections propagates a distance that is twice longer than a distance which the original first reflected wave R1 propagates, the decay of the reflected wave is intense. Therefore, the crest value of the reflected wave is much smaller than that of the original first reflected wave R1.

Therefore, when TOF1 is equal to or smaller than a double of the echo learning value and the crest value of the first reflected wave R1 is not saturated (S1350: YES), the first reflected wave R1 being observed is, in reality, estimated to be a reflected wave stemming from two reflections. If the determination of step S1350 is YES, the near distance retention determination processing proceeds to step S1352, and the near distance retention counter is reset to 0.

When the near distance retention counter is reset to 0, a state in which the near distance retention flag is set to 1, that is, a state in which near distance detection is in progress will be, as mentioned above, retained five times thereafter. When step S1352 is performed, if the determination of step S1350 is NO or step S1346 is performed, near distance retention determination processing in FIG. 5 is terminated.

Referring back to FIG. 3, after near distance retention determination of step S134 is performed, the near distance detection processing proceeds to step S140 that will be described later. When the near distance retention flag is reset to 0, if the determination of step S132 is YES, the processing proceeds to step S136.

At step S136, whether the near distance flag is set to 1 is determined. If the near distance flag is set to 1, the determination of step S136 is YES. The near distance detection processing proceeds to step S138. At step S138, the near distance retention flag is set to 1 and the near distance retention counter is reset to 0.

When the near distance flag is set to 1, that is, an object has been detected at a near distance, the near distance retention flag is set to 1 signifying that near distance detection is in progress. Since a state in which near distance detection is in progress is retained five times after near distance detection is recognized as being in progress, the near distance retention counter is reset to 0.

After step S138 is performed, the near distance detection processing proceeds to step S140. When step S134 is performed or the determination of step S136 is NO, the processing proceeds to step S140. At step S140, whether the near distance retention flag is set to 1 is determined. If the determination is NO, the near distance detection processing in FIG. 3 is terminated. If the determination is YES, the processing proceeds to step S142.

At step S142, existence of an object at a near distance is confirmed. The processing of step S142 is identical to that of step S124. Therefore, the near distance flag is set to 1 and the detection distance D is set to a value obtained by multiplying the echo learning value by the sonic speed.

A state in which the near distance retention flag is set to 1 is retained until the near distance retention counter indicates 5 even if echo prolongation is not observed (S122: NO). Therefore, even if echo prolongation is not observed (S122: NO), existence of an object at a near distance is confirmed until the near distance retention counter indicates 3.

When the near distance detection processing in FIG. 3 is terminated, the main routine proceeds to step S14 in FIG. 2. When the determination of step S10 is YES or step S8 is performed, the main routine proceeds to step S14. In the long distance mode, near distance detection processing (S12) is not performed. Irrespective of whether near distance detection processing (S12) is performed, the control block 14 of the ultrasonic sensor 10 performs object detection on the basis of a comparison of the receiving signal strength A with the strength threshold $TH_4$.

At step S14, the detection distance mode is determined. When the near distance flag is set to 1 or TOF1 is smaller than a learning permissible distance that is set to, for example, 40 cm, the near distance mode is designated. In contrast, when the near distance flag is reset to 0 and TOF1 is equal to or larger than the learning permissible distance, the long distance mode is designated. As mentioned previously, the detection distance mode designated herein is referenced at the time of performing step S6 next time.

Advantageous Effects of Embodiment

When an object exists near the ultrasonic sensor 10, the echo wave R0 and first reflected wave R1 may be superposed on each other and observed as one wave. However, as shown in FIG. 4, the wave having the echo wave R0 and first reflected wave R1 superposed on each other may exhibit a notch N and may therefore be observed as two waves in terms of processing. Depending on the position of the notch N, although the object exists at such a near distance as to receive the first reflected wave R1 despite presence of an echo, the measured echo time may be determined not to have gotten prolonged relative to the echo learning value.

In the present embodiment, even when the measured echo time is determined not to have gotten prolonged relative to the echo learning value (S122: NO), if the ultrasonic sensor 10 detects a reflected wave (S126: YES) and a determination is made that there is a possibility that an object may exist at such a near distance as to receive the first reflected wave R1 despite presence of an echo (S6: near distance mode), echo breaking check is performed (S130).

Echo breaking check is intended to determine whether the addition echo time that is a time obtained by adding a time, which elapses from termination of an echo to termination of the first reflected wave R1, to the measured echo time has been prolonged relative to the echo learning value. If an object exists at such a near distance as to receive the first reflected wave R1 despite presence of an echo, although a wave has the echo wave R0 and first reflected wave R1 superposed on each other, there is a possibility that the wave may be observed as two waves because of the notch N.

In echo breaking check, based on the fact that the addition echo time is larger than the echo learning value+Δt, echo prolongation is recognized as having occurred and the near distance flag is set to 1. Since the echo breaking check is performed, an object existing at a near distance can be highly precisely detected.

In echo breaking check, not only comparison of the addition echo time with the echo learning value but also the crest value of the first reflected wave R1 are taken into consideration in order to make a determination. When the first reflected wave R1 is joined with the echo wave R0, the crest value of the first reflected wave R1 is, similarly to that of the echo wave R0, so large that a possibility that the crest value may be saturated is high. When the addition echo time is larger than the echo learning value+Δt and the crest value of the first reflected value R1 is saturated, echo prolongation is recognized as having occurred and the near distance flag is set to 1. Therefore, compared with a case where whether the near distance flag is set to 1 is determined based merely on the addition echo time, precision in detecting an object existing at a near distance is upgraded.

In the present embodiment, an object existing at a near distance can be highly precisely detected from a point of view described below. Even when an object exists at such a near distance as to receive the first reflected wave R1 despite presence of an echo, the measured echo time may not get prolonged relative to the echo learning value, though it depends on the degree of superposition of the echo wave R0 and first reflected wave R1 on each other. However, the object will not suddenly vanish. Therefore, in the present embodiment, after an object is determined to exist at a near distance and the near distance flag is set to 1, even when the measured echo time is determined not to have gotten prolonged relative to the echo learning value (S1344), the state in which the near distance flag is set to 1 is retained at least five times. Accordingly, the object existing at a near distance can be highly precisely detected.

Further, in the present embodiment, when TOF1 is equal to or smaller than a double of the echo learning value and the crest value of the first reflected wave R1 is not saturated (S1350: YES), the near distance retention counter is reset to 0 (S1350 and S1352). Accordingly, the number of times by which the near distance retention flag is held 1 increases. Although TOF1 is equal to or smaller than the double of the echo learning value, when the crest value of the first reflected wave R1 is not saturated, the original first reflected wave R1 is buried in the echo wave R0. The first reflected wave R1 being observed is thought to be a reflected wave stemming from re-reflection of the original reflected wave R1. Even when a state in which the near distance retention flag is set to 1 is retained by performing steps S1350 and S1352, if an object actually exists at a near distance, precision in detecting the object existing at a near distance is upgraded.

In the present embodiment, in the long distance mode to be designated when TOF1 is equal to or larger than the learning distance, echo learning processing (S8) is performed in order to update the echo learning value. Since the measured echo time varies depending on the state of the ultrasonic sensor 10, when the echo learning value to be compared with the measured echo time is sequentially updated, precision in object detection based on comparison of the measured echo time with the echo learning value is upgraded.

In the present embodiment, when the detection distance mode is the near distance mode, near distance detection processing (S12) is performed. If the detection distance mode is the long distance mode, the near distance detection processing is not performed. In other words, when a determination is made that there is not a possibility that an object may exist at a near distance, the near distance detection processing is not performed. Accordingly, although an object does not exist at a near distance, determining that an object exists at a near distance can be inhibited.

For example, in the aforesaid embodiment, the echo learning value is used as a reference echo time. Namely, in the aforesaid embodiment, the reference echo time is learned. However, the reference echo time may be a pre-designated certain time (first modification). In echo breaking check (S130), whether the near distance flag is set to 1 may be determined based merely on the addition echo time (second modification). This is because even if an echo is large, the maximum signal strength may not be saturated, though it depends on the specifications of hardware. At step S1350, whether the crest value is saturated may not be determined, but whether TOF1 is equal to or smaller than a double of the echo learning value may merely be determined (third modification). Further, the maximum value of the near distance retention counter may be any value other than 5 (fourth modification).

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An ultrasonic object detection device comprising:
a first echo prolongation determination unit that sequentially determines whether a measured echo time, which is a duration of an echo sound to be detected by an ultrasonic sensor after the ultrasonic sensor transmits a transmission wave, is prolonged with respect to a reference echo time;
a second echo prolongation determination unit that determines whether an addition echo time is prolonged with respect to the reference echo time when the first echo prolongation determination unit determines that the measured echo time is not prolonged with respect to the reference echo time, and the ultrasonic sensor detects a reflected wave generated by reflection of the transmission wave on an object, the addition echo time being obtained by adding, to the measured echo time, a time which elapses after an echo is terminated in a receiving signal of the ultrasonic sensor before a first reflected wave as the reflected wave generated for a first time is terminated; and
a short distance object detection unit that determines that an object is disposed within a short distance so as to receive the reflected wave while the echo is not terminated when one of the measured echo time or addition echo time is prolonged with respect to the reference echo time.

2. The ultrasonic object detection device according to claim 1, wherein:
when the addition echo time is prolonged with respect to the reference echo time, and a maximum signal strength of the first reflected wave is saturated, the short distance object detection unit determines that the object is disposed within the short distance.

3. The ultrasonic object detection device according to claim 1, wherein:
the short distance object detection unit repeatedly determines, based on a determination result of the first echo prolongation determination unit and a determination result of second echo prolongation determination unit, whether the object is disposed within the short distance;
when determining that the object is disposed within the short distance, the short distance object detection unit sets a short distance detection state; and
successively, even when each of the measured echo time and the addition echo time is not prolonged with respect to the reference echo time, the short distance object detection unit holds to set the short distance detection state for a predetermined number of repetitive times.

4. The ultrasonic object detection device according to claim 3, wherein:
when a detection time of a first reflected wave as the reflected wave generated for a first time is smaller than twice the reference echo time, and a maximum signal strength of the first reflected wave is saturated, the short distance detection unit increments the predetermined number of repetitive times for which the short distance detection state is held.

5. The ultrasonic object detection device according to claim 3, wherein:
when the near distance detection state is set, the first echo prolongation determination unit determines that the measured echo time is not prolonged with respect to the reference echo time, and the ultrasonic sensor detects the reflected wave generated by reflection of the transmission wave on the object, the second echo prolongation determination unit determines whether the addition echo time is prolonged with respect to the reference echo time.

6. The ultrasonic object detection device according to claim 4, wherein:
the detection time of the first reflected wave is a time interval which elapses after the ultrasonic sensor transmits the transmission wave before detecting the first reflected wave.

7. The ultrasonic object detection device according to claim 1, wherein:
the measured echo time is a time interval which elapses after the ultrasonic sensor terminates transmission of the transmission wave before the ultrasonic sensor terminates detection of the echo sound.

8. An ultrasonic object detection device comprising:
an echo prolongation determination unit that sequentially determines whether a measured echo time, which is a duration of an echo sound to be detected by an ultrasonic sensor after the ultrasonic sensor transmits a transmission wave, is prolonged with respect to a reference echo time; and
a short distance object detection unit that determines that an object is disposed within a short distance so as to receive a reflected wave while an echo is not terminated when the measured echo time is prolonged with respect to the reference echo time, wherein:
the short distance object detection unit repeatedly determines, based on a determination result of the echo prolongation determination unit, whether the object is disposed within the short distance;
when determining that the object is disposed within the short distance, the short distance object detection unit sets a short distance detection state; and
successively, even when the measured echo time is not prolonged with respect to the reference echo time, the short distance object detection unit holds to set the short distance detection state for a predetermined number of repetitive times.

* * * * *